US005776389A

United States Patent [19]

Chaudhary

[11] Patent Number: 5,776,389
[45] Date of Patent: Jul. 7, 1998

[54] PROCESS FOR MAKING AN ALKENYL AROMATIC POLYMER FOAM HAVING ENLARGED CELL SIZE

[75] Inventor: Bharat I. Chaudhary. Westerville, Ohio

[73] Assignee: The Dow Chemical Company, Midland, Mich.

[21] Appl. No.: 667,252

[22] Filed: Jun. 20, 1996

[51] Int. Cl.$^6$ ................................. B29C 44/20
[52] U.S. Cl. ................. 264/50; 264/51; 264/53; 264/DIG. 5; 264/DIG. 15
[58] Field of Search .............. 264/51, 53, DIG. 5, 264/50, DIG. 15

[56] References Cited

U.S. PATENT DOCUMENTS

| | | | |
|---|---|---|---|
| 4,217,319 | 8/1980 | Komori | 264/53 |
| 4,229,396 | 10/1980 | Suh et al. | 264/53 |
| 5,006,568 | 4/1991 | Fukazawa et al. | 521/98 |
| 5,011,866 | 4/1991 | Suh | 521/97 |
| 5,064,874 | 11/1991 | Motani et al. | 521/146 |
| 5,089,533 | 2/1992 | Park | 521/79 |
| 5,462,974 | 10/1995 | Lee | 521/79 |
| 5,489,407 | 2/1996 | Suh et al. | 264/50 |
| 5,527,573 | 6/1996 | Park et al. | 428/314.8 |

*Primary Examiner*—Allan R. Kuhns
*Attorney, Agent, or Firm*—J. Robert Dean, Jr.

[57] ABSTRACT

Disclosed is a process for making an extruded alkenyl aromatic polymer foam with a thickness of about 1 inch (2.54 cm) or more and having an enhanced cell size. From about 0.2 to about 2.0 percent by weight of a glycerol monoester of a $C_{8-24}$ fatty acid is incorporated to increase cell size about 5 percent or more relative to a corresponding foam without the glycerol monoester. The blowing agent is about 50 percent or more of a blowing agent selected from the group consisting of carbon dioxide, 1,1,1,2-tetrafluoroethane, and 1,1,1-trifluoroethane. Further disclosed is an extruded alkenyl aromatic polymer foam obtainable from the process.

15 Claims, No Drawings

PROCESS FOR MAKING AN ALKENYL AROMATIC POLYMER FOAM HAVING ENLARGED CELL SIZE

BACKGROUND OF THE INVENTION

This invention relates to a closed-cell, alkenyl aromatic polymer foam of thick cross-section and enlarged cell size. The invention further relates to a process for making the foam.

Due to present environmental concerns over the use of potentially ozone-depleting blowing agents, it is desirable to make alkenyl aromatic polymer foams with blowing agents having reduced or zero ozone-depletion potential. Such blowing agents include inorganic blowing agents such as carbon dioxide, nitrogen, and argon as well as hydrofluorocarbons such as 1,1,1,2-tetrafluoroethane (HFC-134a) and 1,1,1-trifluoroethane (HFC-143a).

A problem with using the above non-depleting blowing agents is their tendency to form foams of relatively small cell size and cross-section. Such blowing agents typically exhibit relatively small cell size due to their relatively high nucleating potential. Small cell size is especially a problem when particular infrared attenuating agents are employed such as carbon black, graphite, and titanium dioxide.

It would be desirable to be able to employ the non-depleting blowing agents in making alkenyl aromatic polymer foams with or without infrared attenuating agents yet be able to enlarge the cell size of the foam. Enlarging the cell size of the foams would enable greater thicknesses and larger cross-sectional areas to be obtained as well as afford a reduction in foam density. Greater foam thicknesses and cross-sections would enable a broader range of products to be manufactured, and reducing density would allow foams to be manufactured more economically. It is also desirable for the foams to exhibit acceptable physical properties.

Prior art attempts to make a foam having enlarged cell size include the integration of a wax in a foam forming gel prior to extrusion of the gel through a die to form a foam. Such use of a wax is seen in U.S. Pat. No. 4,229,396, which is incorporated herein by reference. The use of a wax may, however, present processing problems and cause thermal stability variations or diminution in physical properties in product foams. The wax may also cause inconsistency in extrusion temperatures. Additional prior art attempts to make a foam having enlarged cell size include the incorporation of a non-waxy compound in a foam forming gel prior to extrusion of the gel through a die to form a foam. Such use of a non-waxy compound is seen in U.S. Pat. No. 5,489,407, which is incorporated herein by reference. It would be desirable to identify cell size enlarging compounds which are yet more effective than those disclosed in that reference at equivalent compound loadings.

SUMMARY OF THE INVENTION

According to the present invention, there is a process for making an extruded alkenyl aromatic polymer foam of a thickness of about 1 inch (25.4 millimeters (mm)) or more and having enhanced cell size. The process comprises: heating an alkenyl aromatic polymer material comprising greater than 50 percent by weight alkenyl aromatic monomeric units to form a melt polymer material; incorporating into the melt polymer material about 0.2 to about 2.0 percent, preferably about 0.5 to about 1.0 percent, by weight of a glycerol monoester of a $C_{8-24}$ fatty acid to increase cell size about 5 percent or more relative to a corresponding foam without the glycerol monoester; further incorporating into the melt polymer material at an elevated pressure to form a foamable gel a blowing agent comprising greater than 50 percent of a blowing agent selected from the group consisting of carbon dioxide, 1,1,1,2-tetrafluoroethane, and 1,1,1-trifluoroethane; and extruding the foamable gel through a die to form the foam.

According to the present invention, there is an extruded alkenyl aromatic polymer foam. The foam comprises: an alkenyl aromatic polymer material comprising greater than 50 percent by weight of alkenyl aromatic monomeric units; the foam having a thickness of about 1 inch (25.4 mm) or more; and the foam comprising from about 0.2 to about 2.0 percent by weight of a glycerol monoester of a $C_{8-24}$ fatty acid.

DETAILED DESCRIPTION

It was found surprising that glycerol monoesters of $C_{8-24}$ fatty acids could be employed in making extruded alkenyl aromatic polymer foams of relatively thick cross-section and enhanced cell size when employing blowing agents of relatively high nucleating potential.

Glycerol monoesters of $C_{8-24}$ fatty acids are useful in the present invention. Useful monoesters include glycerol monopalmitate ($C_{19}H_{38}O_4$), glycerol monostearate ($C_{21}H_{42}O_4$), and glycerol monobehenate ($C_{25}H_{50}O_4$). The monoesters may be isolated or in admixture.

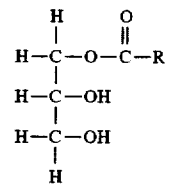

wherein R is an alkyl group having 7-23 carbon atoms.

The acid group may be on any carbon position of the structure.

The glycerol monoesters are incorporated into the present foam in an amount sufficient to increase the average cell size of the foam about 5 percent or more, and preferably 10 percent or more relative to a corresponding foam without the fatty acid ester. A corresponding foam is a foam of substantially the same polymer and blowing agent composition produced at substantially the same process conditions. Cell size is determined according to ASTM D3576-77. Typically, the percent of fatty acid ester in the present foam will range from about 0.2 to about 2.0 percent, preferably about 0.5 to about 1.0 percent, by weight based upon the weight of the polymer material.

The increase in cell size enabled foams having thicknesses in cross-section of about 1 inch (25.4 mm) or more to be more easily produced when employing blowing agents comprised substantially or entirely of carbon dioxide, 1,1,1,2-tetrafluoroethane, or 1,1,1-trifluoroethane. These three blowing agents normally exhibit high nucleation potential, tending to form small cell sizes.

It is desirable to employ the glycerol monoesters at levels wherein certain physical properties of the foams are not substantially impacted. Important physical properties include dimensional stability and closed cell content.

The present foam is particularly suited to be formed into a plank, desirably one having a cross-sectional area of 30 square centimeters (cm) or more and a minor dimension in cross-section (thickness) of 1 inch (2.54 centimeter) or more. Foams of minor dimension in cross-section (thickness) of about 2 inches (5.08 cm) or more are also possible.

The blowing agent employed in the present invention comprises greater than 50 percent and preferably about 70 percent or more weight percent of carbon dioxide and/or 1,1,1,2-tetrafluoroethane (HFC-134a) and/or 1,1,1-trifluoroethane (HFC-143a) based upon the weight of the blowing agent. The blowing agent may also be comprised entirely of any or all of the foregoing blowing agents.

The prior art relates in U.S. Pat. No. 5,149,721 the use of fatty acid esters in making extruded polystyrene foam of good skin quality. Various embodiments of the foam were described as having thicknesses of from 0.5 to 3 millimeters, 3 to 20 millimeters, and 10 to 50 millimeters. Highly volatile foaming agents were described as particularly advantageous and included propane, butane, methyl chloride, and ethyl chloride. The present invention distinguishes the teachings of the reference in that glycerol monoesters are employed to enhance cell size in processes for making alkenyl aromatic polymer foams of thickness of about 1 inch (25.4 mm) or more with a blowing agent comprising greater than 50 percent by weight of carbon dioxide and/or 1,1,1,2-tetrafluoroethane and/or 1,1,1-trifluoroethane based upon the total weight of the blowing agent. These blowing agents exhibit much higher nucleating potential and tendency to form foams of small cell size than those disclosed in the reference.

The prior art further relates in U.S. Pat. No. 5,286,429 the manufacture of extruded polystyrene sheet foam with a blowing agent entirely or almost entirely of carbon dioxide. The polystyrene employed has a melt index of about 8 or more by itself or in combination with another material which results in a mixture having a melt index of 8 or more. Examples of materials to increase melt index include mineral oil, metal salts of stearic acid, fatty acid, fatty alcohols, fatty acid esters, and paraffin waxes. The present invention distinguishes the teachings of the reference in that glycerol monoesters are employed to enhance cell size in processes for making alkenyl aromatic polymer foam planks of thickness of about 1 inch (25.4 mm) or more with blowing agents comprising greater than 50 percent by weight of carbon dioxide and/or 1,1,1,2-tetrafluoroethane and/or 1,1,1-trifluoroethane based upon the total weight of the blowing agent.

The present foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The present alkenyl aromatic polymer foam is generally prepared by heating a alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The glycerol monoesters may be dry-blended with the polymer material prior to charging to the extruder, charged to the extruder in the form of a monoester/polymer material concentrate or a monoester/color pigment carrier material, or may be incorporated into the melt polymer material in the form of a hot melt. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Co-blowing agents useful with carbon dioxide and/or 1,1,1,2-tetrafluoroethane and/or 1,1,1-trifluoroethane in making the present foam structure include inorganic agents, organic blowing agents and chemical blowing agents. Suitable inorganic blowing agents include nitrogen, argon, and helium. Organic blowing agents include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N, N'-dinitrosoterephthalamide, and trihydrazino triazine.

The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, silica, barium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The foam has a density of from about 10 to about 150 and most preferably from about 10 to about 70 kilograms per cubic meter according to ASTM D-1622-88. The foam has an average cell size of from about 0.1 to about 5.0 and preferably from about 0.2 to about 1.5 millimeters according to ASTM D3576-77.

The present foam is closed cell. The present foam is greater than 90 percent closed cell according to ASTM D2856-87.

The present foam structure may be used to insulate a surface by applying to the surface an insulating panel fashioned from the present structure. Such panels are useful in any conventional insulating applications such as roofing, buildings, refrigerators, etc.

The following are examples of the present invention, and are not to be construed as limiting. Unless otherwise indicated, all percentages, parts, or proportions are by weight.

EXAMPLES

Alkenyl aromatic polymer foams of the present invention are made according to the process of the present invention.

Example 1 and Control Example 1

An alkenyl aromatic polymer foam was made according to the process of the present invention. The foam of the invention was made with a quantity of glycerol monoester as a cell size enlarger. A control foam was made by the same process except that glycerol monoester was not employed. The foam of the present invention and the control foam were tested and compared for cell size and other physical properties.

The foams were made with an apparatus comprising an extruder, a mixer, a cooler, and a die in series. Polymer feedstock and additives were dry-blended and fed into the extruder to form a melt polymer material. Both the blowing agent and the glycerol monoester were injected into the melt polymer material in the mixer to form a foamable gel. The foamable gel was cooled in the cooler to a desirable foaming temperature and conveyed through the die into a region of lower pressure to form the foam.

The polymer feedstock employed was a 90 percent by weight of granular polystyrene having a weight average molecular weight of about 132,000 according to size exclusion chromatography (SEC) and 10 percent by weight of a 50/50 styrene/alphamethylstyrene copolymer of 4800 weight average molecular weight according to SEC. The glycerol monoester employed was Atmer 129 (ICI) brand. Other additives were 0.2 pph tetrasodium pyrophosphate, 0.05 pph barium stearate, 0.5 pph linear low density polyethylene, 0.01 pph blue pigment, and 2.5 pph hexabromocyclododecane. The blowing agent employed was 4.7 pph carbon dioxide. Parts per hundred based upon polymer weight is abbreviated as "pph."

The foam of the present invention containing glycerol monostearate exhibited a substantially larger cell size, lower system pressure drop, and lower density than the control foam which did not contain glycerol monoester. Other foam properties were acceptable. Physical properties are set forth in Table 1.

Example 2 and Control Example 2

An alkenyl aromatic polymer foam was made according to the process of the present invention. The foam of the invention was made with a quantity of titanium dioxide to reduce thermal conductivity and with a quantity of glycerol monoester as a cell size enlarger. A control foam was made by the same process except that glycerol monoester was not employed. The foam of the present invention and the control foam were tested and compared for cell size and other physical properties.

The apparatus and method of Example 1 were employed except titanium dioxide was fed to the extruder in a 50 percent concentrate with polystyrene. Additional polystyrene was fed to the extruder to reduce the titanium dioxide level to 10 pph. The polystyrene and additives employed were also the same.

The foam of the present invention containing glycerol monostearate exhibited a substantially larger cell size, lower system pressure drop, and lower density than the control foam which did not contain glycerol monoester. Other foam properties were acceptable. Physical properties are set forth in Table 2.

TABLE 1

FOAMS OF EXAMPLE 1 AND CONTROL EXAMPLE 1

| Run No. | Foaming Temperature (°C.) | Glycerol Monoester (pph) | Infrared Attenuator (pph) | Pressure Drop[1] (psi) | Vertical Cell Size[2] (mm) | Density without skin (pcf) | Open Cell (volume percent) | Environmental Dimensional Change Test | Total Compressive Strength |
|---|---|---|---|---|---|---|---|---|---|
| 1* | 125 | None | None | 1098.6 | 0.36/0.34 | 2.49 | 1.3 | Pass | 137.7 |
| 2 | 125 | 0.75 | None | 923.1 | 0.41/0.41 | 2.22 | 4.2 | Pass | 116.3 |

*Not an example of the present invention

[1]Pressure drop = the difference in pressure drop between the pressure at the inlet of the mixer and the entry to the die

[2]Average cell size (two measurements each)

TABLE 2

FOAMS OF EXAMPLE 2 AND CONTROL EXAMPLE 2

| Run No. | Foaming Temperature (°C.) | Glycerol Monoester (pph) | Infrared Attenuator (pph) | Pressure Drop[1] (psi) | Vertical Cell Size[2] (mm) | Density without skin (pcf) | Open Cell (volume percent) | Environmental Dimensional Change Test | Total Compressive Strength |
|---|---|---|---|---|---|---|---|---|---|
| 3 | 122 | 0.75 | 10 titanium dioxide | 976.5 | 0.33/0.30 | 2.54 | 8.2 | Pass | 132.3 |
| 4* | 124 | None | 10 titanium dioxide | 1036.8 | 0.25/0.23 | 2.68 | 8.6 | Pass | 160.6 |

*Not an example of the present invention
[1]Pressure drop = the difference in pressure drop between the pressure at the inlet of the mixer and the entry to the die
[2]Average cell size (two measurements each)

While embodiments of the foam and the process for making of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making an extruded alkenyl aromatic polymer foam with a thickness of about 1 inch or more and having enhanced cell size, comprising:
   a) heating an alkenyl aromatic polymer material comprising greater than 50 percent by weight alkenyl aromatic monomeric units to form a melt polymer material;
   b) incorporating into the melt polymer material about 0.2 to about 2.0 percent by weight of a glycerol monoester of a $C_{8-24}$ fatty acid to increase cell size about 5 percent or more relative to a corresponding foam without the glycerol monoester;
   c) further incorporating into the melt polymer material at an elevated pressure to form a foamable gel a blowing agent comprising greater than 50 percent of a blowing agent selected from the group consisting of carbon dioxide and 1,1,1-trifluoroethane; and
   d) extruding the foamable gel through a die to form a foam.

2. The process of claim 1, wherein the alkenyl aromatic polymer material comprises greater than 70 percent by weight of alkenyl aromatic monomeric units.

3. The process of claim 1, wherein the foam has a thickness of about 2 inches or more.

4. The process of claim 1, wherein the foam comprises from about 0.5 to about 1.0 percent by weight of a glycerol monoester of a $C_{8-24}$ fatty acid.

5. The process of claim 1, wherein the glycerol monoester of a $C_{8-24}$ fatty acid is incorporated to increase the cell size about 10 percent or more relative to a corresponding foam without the glycerol monoester.

6. The process of claim 1, wherein the glycerol monoester is selected from the group consisting of glycerol monostearate, glycerol monopalmitate, and glycerol monobehenate.

7. The process of claim 1, wherein the blowing agent comprises about 70 percent or more of a blowing agent selected from the group consisting of carbon dioxide and 1,1,1-trifluoroethane.

8. The process of claim 1, wherein the foam has a density of from about 10 to about 150 kilograms per cubic meter ($kg/m^3$) and a cell size of about 0.1 to about 5.0 millimeters.

9. The process of claim 1, wherein the foam has a density of from about 10 to about 70 $kg/m^3$ and a cell size of about 0.2 to about 1.5 millimeters.

10. The process of claim 1, wherein the alkenyl aromatic polymer material comprises greater than 70 percent by weight of alkenyl aromatic monomeric units, the glycerol monoester of a $C_{8-24}$ fatty acid is incorporated to increase the cell size about 10 percent or more relative to a corresponding foam without the glycerol monoester, and the foam has a density of from about 10 to about 150 $kg/m^3$ and a cell size of about 0.1 to about 5.0 millimeters.

11. The process of claim 1, wherein the alkenyl aromatic polymer material comprises greater than 70 percent by weight of alkenyl aromatic monomeric units, the foam comprises from about 0.5 to about 1.0 percent by weight of a glycerol monoester of a $C_{8-24}$ fatty acid, the glycerol monoester of a $C_{8-24}$ fatty acid is incorporated to increase the cell size about 10 percent or more relative to a corresponding foam without the glycerol monoester, and the foam has a density of from about 10 to about 70 $kg/m^3$ and a cell size of about 0.2 to about 1.5 millimeters.

12. The process of claim 9, wherein the glycerol monoester is selected from the group consisting of glycerol monostearate, glycerol monopalmitate, and glycerol monobehenate.

13. The process of claim 10, wherein the glycerol monoester is selected from the group consisting of glycerol monostearate, glycerol monopalmitate, and glycerol monobehenate.

14. The process of claim 12, wherein the foam has a thickness of about 2 inches or more.

15. The process of claim 13, wherein the foam has a thickness of about 2 inches or more.

* * * * *